April 2, 1940. W. C. GROENIGER 2,195,797
WATER POLLUTION PROTECTING DEVICE
Filed Sept. 15, 1936 2 Sheets-Sheet 1
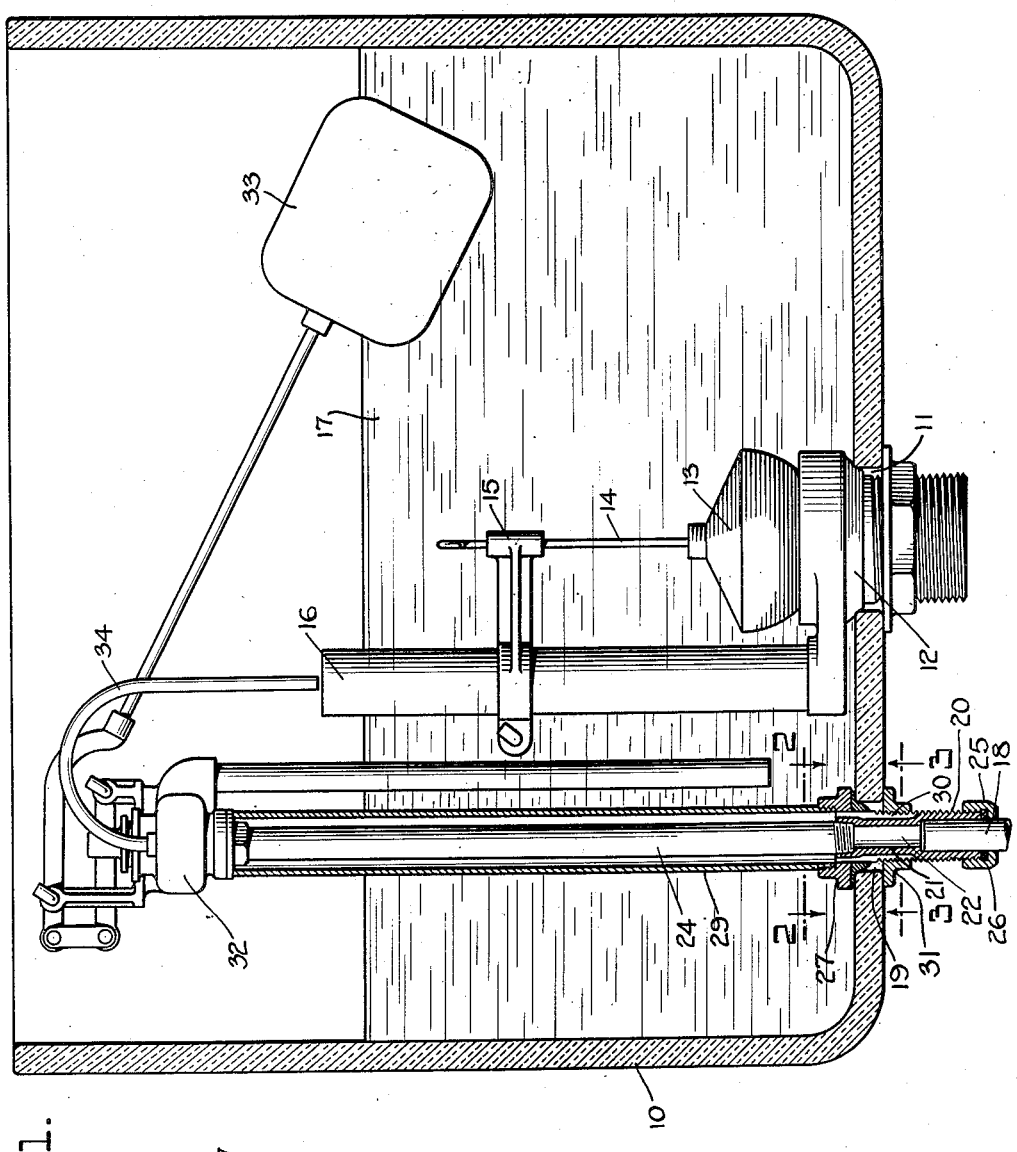
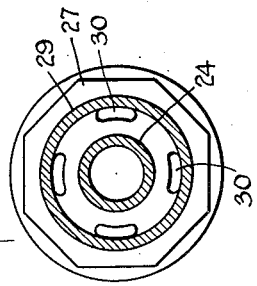
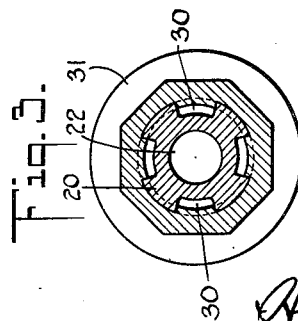
INVENTOR
William C. Groeniger
BY
Henry J. Luelle
HIS ATTORNEY April 2, 1940.  W. C. GROENIGER  2,195,797
WATER POLLUTION PROTECTING DEVICE
Filed Sept. 15, 1936  2 Sheets-Sheet 2
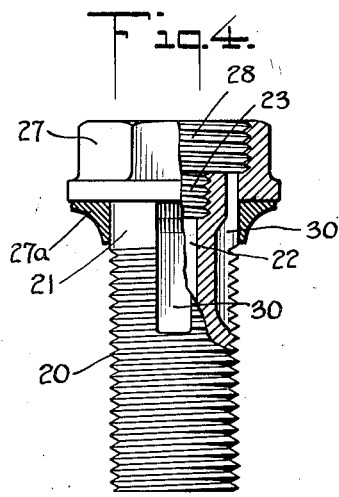
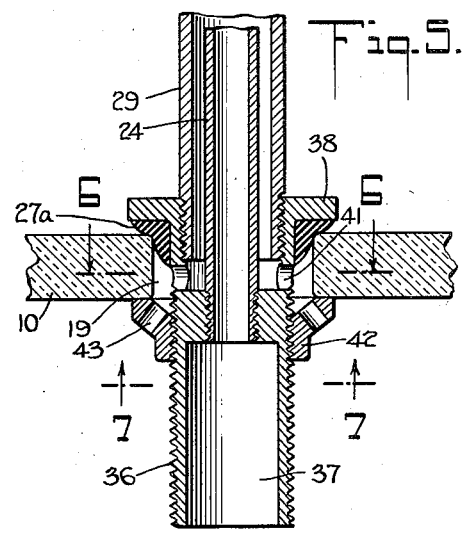
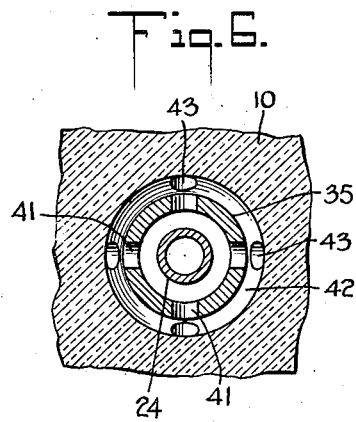
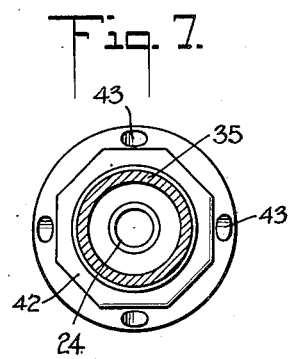
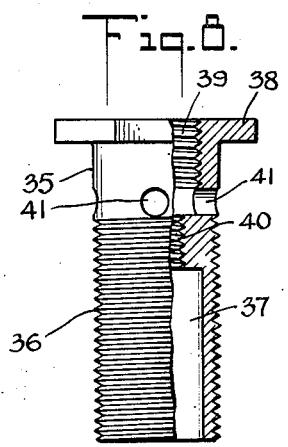
INVENTOR
William C. Groeniger
BY
Henry J. Lueke
HIS ATTORNEY Patented Apr. 2, 1940

2,195,797

UNITED STATES PATENT OFFICE 2,195,797

WATER POLLUTION PROTECTING DEVICE

William C. Groeniger, Columbus, Ohio, assignor to John B. Pierce Foundation, New York, N. Y., a corporation of New York Application September 15, 1936, Serial No. 100,845

5 Claims. (Cl. 137—21)

My present invention relates to means for conveying a safe water through polluted water or water of doubtful character.

Water supply distributing piping systems are connected to various outlets, such for example as potable water outlets, and to outlets serving cisterns, tanks, reservoirs, toilets and the like, and in many instances it may be desirable or necessary to lead a section of a pipe forming part of the system through such cistern, tank, reservoir, toilet, or other receptacle served by the system. As the water in the receptacles through which such portion of the system passes may be polluted or of doubtful character, it is necessary to provide means to prevent any contaminated, infected, or polluted water sewage or waste water from a tank, cistern, reservoir, toilet or receiving basin from entering, flowing, or being sucked back into the water supply distributing piping system.

It is at present well known that a leak of considerable proportions may be present in a water supply system where the supply system passes through a tank or other receptacle, and such leak is not easily detected, particularly where the leak is below the normal water level in the tank. A leak of the submerged type creates little or no noise and a small discharge through a tank overflow is not apparent for example, in a closet bowl having a submerged jet.

The return of water to the water distributing system will occur under conditions where a vacuum is created in the water supply distributing system where the demand is greater than the capacity of the system to deliver. Such conditions are common in the case of fires where there is a great demand for water and the normal supply to other outlets is reduced, with the result that a vacuum occurs in a portion of the distributing system. The vacuum created is dissipated through valves and plumbing fixtures by ordinarily reversing the normal direction of flow of the water and under such conditions the contents of plumbing fixtures and tanks may return to the distributing system unless the vacuum is dissipated by entrance of air to the water distributing system.

While my present invention is applicable in any situation in which it is necessary to pass a portion of a water distributing system through a tank or similar receptacle which may contain contaminated or polluted water, it is of exceptional value in connection with water closets and therefore in the present instance I have illustrated my invention as associated with a water closet flushing tank. The present tendency in closet bowl design is to make the tank and bowl in one piece, or to set the tank on the bowl and eliminate the usual flush tube or elbow. In such latter designs of closet bowls the tank water may be polluted by fecal matter in the event of closet bowl stoppage because the tank in such design is below the overflow point of the closet bowl. In other types of tanks where the return of fecal matter to the tank is not possible the tank water is ordinarily exposed to contamination by insects, vermin, dirt and debris.

My present invention provides for the carrying of the safe water of a water distributing system through a body of water in a tank or system, and maintaining the water in the water distributing system free from contact with the water in the tank, and thereby prevent possible contamination of the water of the distributing system from this source.

A feature of my invention therefore is the provision of means for conveying a safe water through a polluted water, or water of doubtful character, to prevent contaminated, infected, or polluted water from entering, flowing or being sucked back into a water supply distributing system.

A feature of my invention is the provision of means for conveying a safe water through a body of polluted water, or water of doubtful character, in such a manner as to maintain the safe water out of physical engagement or contact with the possible polluted water.

In the accompanying drawings,

Fig. 1 is an elevation, partly in section, of a water closet flush bowl to which my invention has been applied;

Fig. 2 is a section taken on the line 2—2 of Fig. 1;

Fig. 3 is a section taken on the line 3—3 of Fig. 1;

Fig. 4 is an elevation partly in section of the type of tail piece employed in the construction of Fig. 1;

Fig. 5 is another form of tail piece of the general type shown in Fig. 4;

Fig. 6 is a section taken on the line 6—6 of Fig. 5;

Fig. 7 is a section taken on the line 7—7 of Fig. 5; and

Fig. 8 is an elevation partly in section of a further modified form of tail piece.

Referring to the drawings, 10 designates a water closet flush tank but which may be a tank, cistern or any other desired container or storage medium for water, and which tank is ordinarily filled or replenished from a water distributing system. The tank 10 is shown open at the top and is ordinarily closed, or may be closed at the top, by a cover. At the bottom of the tank is arranged a drain opening 11 in which is arranged the valve structure 12 having a movable valve member 13 operated in any desired way, as by means of an operating rod 14, which operating rod is slidably mounted in a guide 15 attached to an overflow tube 16 and which overflow tube forms part of and communicates with the valve structure 12. The operating rod 14 is controlled in any suitable manner not essential to the present invention and which means upon moving the rod 14 upwardly will remove the valve member 13 from its seat in the valve structure 12 whereupon the water 17 in the tank 10 will flow through the valve structure 12 thereby emptying the tank 10.

The tank 10 is filled with water from a water distributing system of which the pipe 18 represents a part and my invention provides means to connect the water supply system pipe 18 to the tank 10 in such a manner that the water supply system pipe 18 will never come into engagement with the water 17 in the tank 10, and also it is desirable both for appearance and results that the water pipe of the distributing system pass through or be disposed within the confines of the tank but out of contact with the body of water 17 in the tank 10.

To accomplish the above results I provide the tank 10 with a perforation 19 in its bottom plate and through such perforation pass the lower thread end 20 of a tail piece 21, such as is clearly shown in Fig. 4. Referring to such Fig. 4 it will be noted that the tail piece 21 is provided with a bore 22 in its axis, the lower end of the bore being enlarged to receive the upper end of the pipe 18 and the upper end of the bore being enlarged and internally threaded as indicated at 23 to receive the lower threaded end of a pipe 24 which forms, see also Fig. 1, a continuation of the pipe 18 of the water distributing system. To insure a tight joint between the upper end of the pipe 18 and the lower enlarged end of the bore 22 I provide a packing nut 25 which screws on to the threads 20 of the tail piece and within such packing nut place any plastic or pliable packing material 26.

The upper end of the tail piece 21 is enlarged and provided with a non-cylindrical or multisided top 27 for the reception of a wrench, as clearly shown in Fig. 4. The upper end of the enlarged portion 27 is bored and threaded as indicated at 28 to receive the lower threaded end of a pipe 29, as clearly shown in Fig. 1. The upper end of the tail piece 21 is provided about its periphery with a plurality of ports or ways 30 which extend upwardly through the enlarged portion 27 and enter into the space formed by the threaded portion 28, as clearly shown in Figures 2 and 3. Below the enlarged portion 27 and at the junction thereof with the body of the tail piece 21 I arrange a gasket 27a of resilient material, such for example as rubber, and place the tail piece 21 in position with respect to the perforation 19 in the bottom of the tank 10 as shown in Fig. 1 and screw onto the threads 20 a nut 31, thereby drawing the enlarged portion 28 of the tail piece 21 into close association with the tank 10 and making a tight joint to prevent water flowing out through the perforation 19.

Referring to Fig. 1 it will be seen that the ports or ways 30 communicate with the interior of the pipe 29 and also with the atmosphere below the nut 31, thereby providing a clear passage for water from the pipe 29 to the atmosphere at all times. It will be apparent therefore that if the pipe 24 within the pipe 29 should leak at any time, the water passing through such leak will flow through the ports 30 and out to the outer air. Therefore as the pipe 24 has, by its attachment as above described, become part of the water distributing system as represented by the pipe 18, such water distributing system will be maintained out of physical contact with the water 17 in the tank 10 at all times and no hidden leak, either in the pipe 24 or in the pipe 29, can result in water which has once passed from the distributing system to the tank 10 ever returning to the water distributing system.

The upper end of the pipe 24 constituting a part of the water distributing system has secured to its top end a valve structure 32 which closes the upper end of the pipe 29. The valve 32 is controlled in the usual manner by the float 33 and the valve 32 is provided with the usual overflow pipe 34 which leads into the overflow pipe 16 and which overflow pipe determines the maximum or overflow level of the water 17 in the tank 10 or otherwise as preferred.

Referring now to Figs. 5, 6, 7 and 8, wherein I have shown another form of tailpiece as a substitute for the tailpiece 21 shown in Figs. 1, 2, and 3, 10 designates the bottom plate of the tank wherein the perforation 19 is closed by a tailpiece 35. Such tailpiece has the lower portion of the body provided with threads 36, and the lower end of the body is provided with a bore 37 to receive the upper end of the pipe 18 and the packing nut 25. The upper end of the body of the tailpiece 35 is provided with an integral flange 38 of greater diameter than the diameter of the perforation 19, and such upper end is also threaded and tapped, as indicated by the reference numeral 39, to receive the lowered threaded end of the pipe 29.

The portion of the body of the tailpiece 35 between the counterbored portion 37 and the drilled and tapped portion 39, is drilled and tapped as indicated at 40 to receive the lower threaded end of the pipe 24. The body 35 is drilled or provided with perforations 41 extending radially and spaced about the periphery of the body, and communicates with the annular space between the pipes 24 and 29, as clearly shown in Fig. 5. Associated with the flange 38 and body 35 I utilize, as in the example described above, the gasket 27a and bring the gasket 27a into close association with the periphery of the perforation 19 in the tank 10 by means of a nut 42.

This nut is provided with a plurality of perforations 43 which extend upwardly and inwardly as shown in Figs. 5, 6 and 7, and communicate with the holes 41 so that any water which finds its way into the annular space between the pipes 24 and 29, whether from leakage from the pipe 29 or leakage from the pipe 24, will flow out through the holes 41 and 43 into the outer atmosphere.

In embodiments of my invention, the pipe from the water supply system and therefore the water supply system itself is led through a body or volume of water which may or may not be contaminated, whereby the water supply system is maintained not only out of actual physical contact with the body of possibly contaminated water, but is maintained out of contact in such manner that no actual contact can occur under any circumstances. Should a leak develop at the point where the water is passing through the tank the presence of such leak will make itself manifest by flowing into the outer atmosphere, and under no circumstances into the water supply system.

Whereas I have described my invention by reference to specific forms thereof, it will be understood that many changes and modifications may be made without departing from the spirit of the invention.

I claim:

1. In a water supply system the combination with a tank for holding water which may be contaminated or polluted or otherwise unfit for human consumption, of an outlet for said tank, a flange, means for securing said flange at the outlet to the tank, a tubular member screwed into one end of said flange and extending upwardly to a point above the height of the water within the tank, passages formed in said flange and communicating with the inside of the tubular member and extending downwardly to the outer air, a water supply pipe screwed into the flange and lying wholly within the first said tubular member, and means for connecting said water supply pipe to the water supply system through the flange, whereby the water supply pipe passes upwardly through the flange and through the water within the tank and wholly out of contact therewith.

2. In a water supply system, the combination with a tank for holding water and provided with an orifice in the lower portion thereof, a tailpiece extending downwardly through said orifice and secured in position to close the same, means in said tailpiece for securing a section of water pipe and a section of tube in concentric relation and with the water pipe within the tube and said tube extending upwardly beyond the height of the water within the tank, a plurality of passages formed in said tailpiece and communicating at their upper ends with the annular space between the tube and pipe, and at their lower ends communicating with the outer atmosphere, whereby the annular space between the pipe and tube is open to the atmosphere at all times, a passageway formed in said tailpiece communicating with the interior of the water pipe, and means for connecting said passageway with a water main.

3. In a water supply system the combination of a tank adapted to contain a volume of polluted, or contaminated, or otherwise unpotable water, an outlet formed in the bottom wall of said tank and spaced from the sides of said tank, a tailpiece normally closing said outlet and comprising a body member having formed integral therewith a flange at its upper end, means in said upper end for securing a tube and a water pipe in concentric relation and out of engagement with each other, ports formed in the body of said tailpiece and connecting the annular space between the tube and pipe with the outer atmosphere at all times, means for securing said tailpiece in operative position with respect to the outlet, a passageway extending axially of the tailpiece and communicating with the interior of the water pipe, and means for connecting said water pipe to a water main.

4. In a water supply distributing system, the combination of a container for water which may be polluted or contaminated or unfit for human consumption, of means associated with the container and in direct engagement with water contained therein, and forming a conduit extending upwardly through the container from the bottom to a point above the normal level of the water in the container, a water supply pipe forming part of the supply distributing system extending upwardly through the conduit for supplying water to the container, means for securing the water supply pipe in spaced relation to the conduit and within the same, to thereby maintain the water supply pipe out of physical engagement with water which has once passed through the water supply pipe into the container, and drainage means provided in the securing means, for the drainage of water which may collect in the conduit.

5. In a water supply distributing system, the combination of a container, for water which may be polluted or contaminated or unfit for human consumption, of means associated with the container and in direct engagement with water contained therein, and forming a conduit extending upwardly through the container from the bottom to a point above the normal level of the water in the container, and entirely surrounded by the water in the container, the water supply pipe forming part of the supply distributing system extending through the conduit to a point above the conduit and delivering water to the container, means for securing the water supply pipe in spaced relation to the conduit and within the same to thereby maintain the water supply pipe out of physical engagement throughout its entire length with the conduit and with water which has once passed through the water supply pipe into the container, and drainage means provided in the securing means for the space between the interior of the conduit and the exterior of the water supply pipe.

WILLIAM C. GROENIGER.